United States Patent
Ozturk et al.

(10) Patent No.: US 11,765,717 B2
(45) Date of Patent: Sep. 19, 2023

(54) ENHANCED COORDINATION OF COMMUNICATION ON LINKS FOR MULTIPLE SUBSCRIBER IDENTIFICATION MODULES (SIMS)

(71) Applicant: QUALCOMM Incorporated, San Diego, CA (US)

(72) Inventors: Ozcan Ozturk, San Diego, CA (US); Gavin Bernard Horn, La Jolla, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/318,480

(22) Filed: May 12, 2021

(65) Prior Publication Data

US 2021/0377978 A1 Dec. 2, 2021

Related U.S. Application Data

(60) Provisional application No. 63/030,782, filed on May 27, 2020.

(51) Int. Cl.
| | |
|---|---|
| *H04W 72/1268* | (2023.01) |
| *H04W 72/0446* | (2023.01) |
| *H04W 72/50* | (2023.01) |
| *H04W 76/15* | (2018.01) |
| *H04W 80/02* | (2009.01) |

(52) U.S. Cl.
CPC ... *H04W 72/1268* (2013.01); *H04W 72/0446* (2013.01); *H04W 72/535* (2023.01); *H04W 76/15* (2018.02); *H04W 80/02* (2013.01)

(58) Field of Classification Search
CPC ......... H04W 72/1268; H04W 72/0446; H04W 72/1257; H04W 76/15; H04W 80/02
(Continued)

(56) References Cited

U.S. PATENT DOCUMENTS

| | | | |
|---|---|---|---|
| 10,568,073 B2 * | 2/2020 | Pathak | H04W 76/10 |
| 2013/0303181 A1 * | 11/2013 | Rajurkar | H04W 72/0453 455/452.1 |

(Continued)

FOREIGN PATENT DOCUMENTS

WO  WO-2014070066 A1 *  5/2014 ............ H04W 16/14

OTHER PUBLICATIONS

International Search Report and Written Opinion—PCT/US2021/032294—ISA/EPO—dated Aug. 19, 2021.
(Continued)

*Primary Examiner* — Intekhaab A Siddiquee
(74) *Attorney, Agent, or Firm* — Patterson & Sheridan LLP

(57) ABSTRACT

Aspects of the present disclosure present techniques for coordination between a user equipment (UE) and one or more network entities to allow necessary interruptions on a first link associated with a first subscriber identification module (SIM) of the UE in order to establish or use a second link associated with a second SIM of the UE. A UE may include two or more SIMs, such as, for example, when offering Dual-SIM-Dual-Active (DSDA) functionalities. The UE may be limited by a single receiving chain, disregarding the multiple SIMs carried therein. The present disclosure alleviates or removes such limitations by coordinating between the UE and one or more network entities to optimize the use of the multiple SIMs.

28 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0289314 | A1* | 10/2015 | Yang .................... | H04W 88/06 |
| | | | | 455/552.1 |
| 2016/0050644 | A1* | 2/2016 | Anand .............. | H04W 72/1215 |
| | | | | 455/458 |
| 2016/0381710 | A1* | 12/2016 | Bansal ................. | H04W 72/12 |
| | | | | 370/336 |
| 2017/0086100 | A1* | 3/2017 | Sagar ................ | H04W 36/0011 |
| 2017/0359772 | A1 | 12/2017 | Lee | |
| 2021/0006963 | A1* | 1/2021 | Chauhan ............. | H04W 60/005 |

OTHER PUBLICATIONS

Qualcomm Incorporated: "Solution for Scheduling Gap", 3GPP Draft, SA WG2 Meeting #136, S2-1911732, 3rd Generation Partnership Project (3GPP), Mobile Competence Centre, 650, Route Des Lucioles, F-06921 Sophia-Antipolis Cedex, France, vol. SA WG2, No. Reno, USA, Nov. 18, 2019-Nov. 22, 2019, Nov. 8, 2019 (Nov. 8, 2019), XP051821809, 2 Pages, Retrieved from the Internet: URL: https://ftp.3gpp.org/tsg_sa/WG2_Arch/TSGS2_136_Reno/Docs/S2-1911732.zip. S2-1911732 schedule gap.doc [retrieved-on Nov. 8, 2019] the whole document.

* cited by examiner

ENHANCED COORDINATION OF COMMUNICATION ON LINKS FOR MULTIPLE SUBSCRIBER IDENTIFICATION MODULES (SIMS)

CROSS-REFERENCE TO RELATED APPLICATION(S)

This application claims benefit of and priority to U.S. Provisional Application No. 63/030,782 filed May 27, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for coordinating connection(s), for example, between a user equipment (UE) having multiple subscriber identification modules (SIMs) and one or more network entities (e.g., base stations (BSs)).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Some features will now be discussed briefly. After considering this discussion, and particularly after reading the section entitled "Detailed Description" one will understand how the features of this disclosure provide advantages that include improved performance of user equipments (UEs) operating with multiple subscriber identity modules (SIMs).

Certain aspects provide a method for wireless communication by a UE. The method generally includes establishing a first link with a network entity, the first link associated with a first SIM of the UE, coordinating with the network entity to establish a pattern of gaps to interrupt communications on the first link to allow for communications on a second link associated with a second SIM of the UE, dynamically changing the pattern of gaps, and communicating on the first and second links, in accordance with the dynamically changed pattern of gaps.

Certain aspects provide a method for wireless communication by a network entity. The method generally includes establishing a first link with a UE, the first link associated with a first SIM of the UE, coordinating with the UE to establish at least one pattern of gaps to interrupt communications on the first link to allow for the UE to communicate on a second link associated with a second SIM of the UE, dynamically changing the at least one pattern of gaps, and communicating with the UE on at least the first link, in accordance with the dynamically changed at least one pattern of gaps.

Certain aspects can be implemented in an apparatus for wireless communication by a UE. The apparatus may include at least one processor and a memory coupled to the at least one processor, the memory including instructions executable by the at least one processor to cause the apparatus to establish a first link with a network entity, the first link associated with a first SIM of the UE, coordinate with the network entity to establish a pattern of gaps to interrupt communications on the first link to allow for communications on a second link associated with a second SIM of the UE, dynamically change the pattern of gaps, and communicate on the first and second links, in accordance with the dynamically changed pattern of gaps.

Certain aspects can be implemented in an apparatus for wireless communication by a network entity. The apparatus may include at least one processor and a memory coupled to the at least one processor, the memory including instructions executable by the at least one processor to cause the apparatus to establish a first link with a UE, the first link associated with a first SIM of the UE, coordinate with the UE to establish at least one pattern of gaps to interrupt communications on the first link to allow for the UE to communicate on a second link associated with a second SIM of the UE, dynamically change the at least one pattern of gaps, and communicate with the UE on at least the first link, in accordance with the dynamically changed at least one pattern of gaps.

Certain aspects can be implemented in an apparatus for wireless communication by a UE. The apparatus may include means for establishing a first link with a network entity, the first link associated with a first SIM of the UE, means for coordinating with the network entity to establish a pattern of gaps to interrupt communications on the first link to allow for communications on a second link associated with a second SIM of the UE, means for dynamically changing the pattern of gaps, and means for communicating on the first and second links, in accordance with the dynamically changed pattern of gaps.

Certain aspects can be implemented in an apparatus for wireless communication by a network entity. The apparatus may include means for establishing a first link with a UE, the first link associated with a first SIM of the UE, means for coordinating with the UE to establish at least one pattern of gaps to interrupt communications on the first link to allow for the UE to communicate on a second link associated with a second SIM of the UE, means for dynamically changing the at least one pattern of gaps, and means for communicating with the UE on at least the first link, in accordance with the dynamically changed at least one pattern of gaps.

Certain aspects can be implemented in a non-transitory computer-readable medium for wireless communication by a UE. The non-transitory computer-readable medium may comprise computer-executable instructions that, when executed by one or more processors of a processing system, cause the processing system to establish a first link with a network entity, the first link associated with a first SIM of the UE, coordinate with the network entity to establish a pattern of gaps to interrupt communications on the first link to allow for communications on a second link associated with a second SIM of the UE, dynamically change the pattern of gaps, and communicate on the first and second links, in accordance with the dynamically changed pattern of gaps.

Certain aspects can be implemented in a non-transitory computer-readable medium for wireless communication by a network entity. The non-transitory computer-readable medium may comprise computer-executable instructions that, when executed by one or more processors of a processing system, cause the processing system to establish a first link with a UE, the first link associated with a first SIM of the UE, coordinate with the UE to establish at least one pattern of gaps to interrupt communications on the first link to allow for the UE to communicate on a second link associated with a second SIM of the UE, dynamically change the at least one pattern of gaps, and communicate with the UE on at least the first link, in accordance with the dynamically changed at least one pattern of gaps.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for coordination between a user equipment (UE) and one or more network entities (e.g., base stations (BSs)) to allow necessary interruptions on a first link associated with a first subscriber identification module (SIM) of the UE in order to establish or use a second link associated with a second SIM of the UE. The techniques described herein may enable a UE with multiple SIMs to communicate on multiple links for multiple SIMs by establishing patterns of gaps that allow necessary interruptions on one link and/or reduced UE capability to receive on both links.

Advantageously, dynamically updating gap patterns, as proposed herein, allow a multi-SIM UE and/or network entity to adapt to changing needs of the different SIM links. For example, gap patterns may be adjusted based on relative traffic loading between multiple universal SIMs (USIMs).

The following description provides examples of techniques for optimizing an enhanced coordination of communication of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communications System

Figure 1:
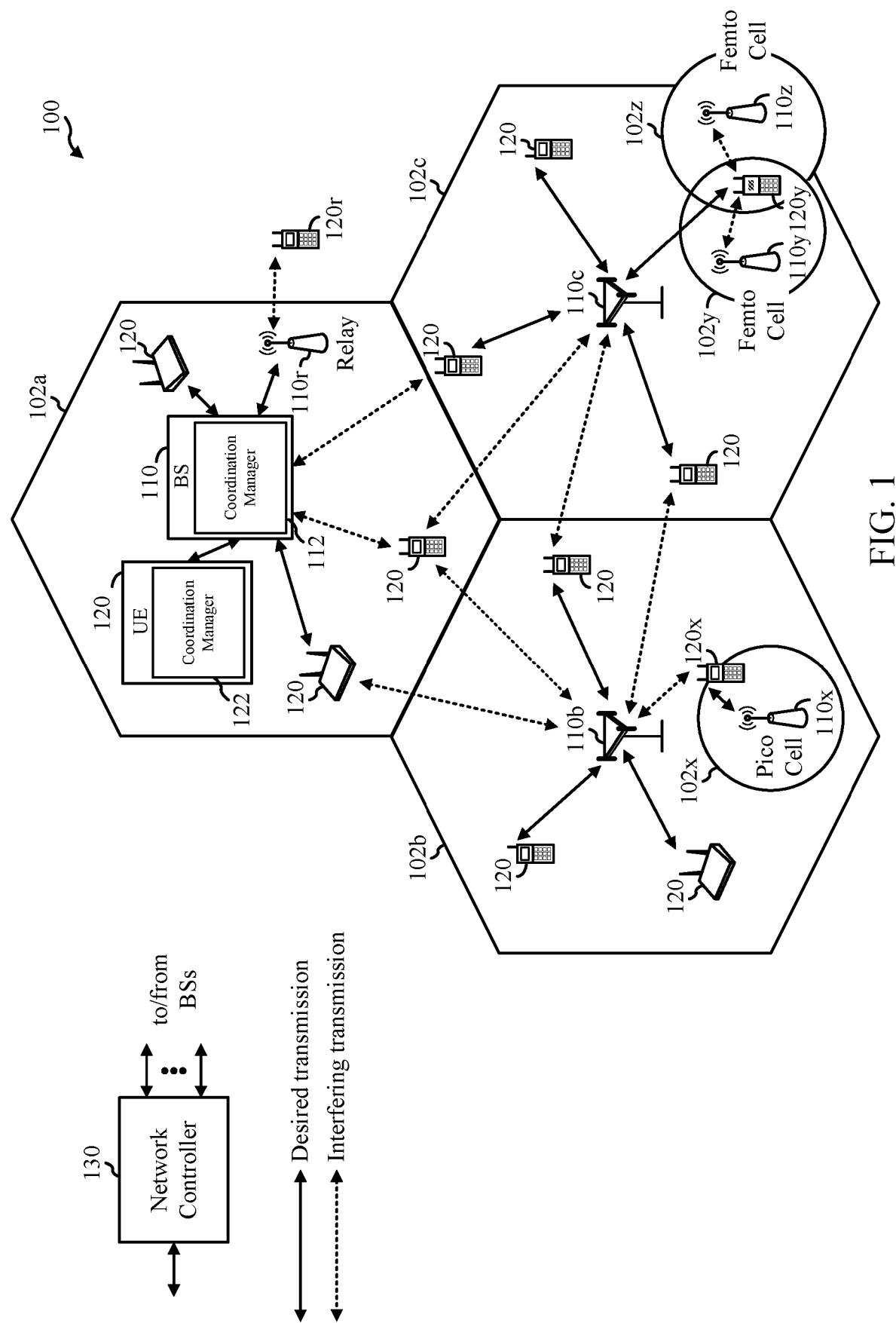
FIG. 1 is a block diagram conceptually illustrating an example wireless communications system, in accordance with certain aspects of the present disclosure.

FIG. 1 illustrates an example wireless communication network 100 in which aspects of the present disclosure may be performed. As shown in FIG. 1, the wireless communication network 100 may include a user equipment (UE) 120 that supports (or operates with) multiple subscriber identification module (SIMs) and is configured to perform operations 500 of FIG. 5. Similarly, the wireless communication network 100 may include a base station (BS) 110 configured to perform operations 600 of FIG. 6 to assist a UE 120 performing operations 500 of FIG. 5. For example, the UE 120 includes a Coordination Manager 122 and the BS 110 includes a Coordination Manager 112. The Coordination Manager 122 and the Coordination Manager 112 may be configured to perform an enhanced coordination of communication, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio (NR) BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the like, that receive a transmission of data and/or other information from an upstream station (e.g., a BS 110 or a UE 120r) and sends a transmission of the data and/or other information to a downstream station (e.g., a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
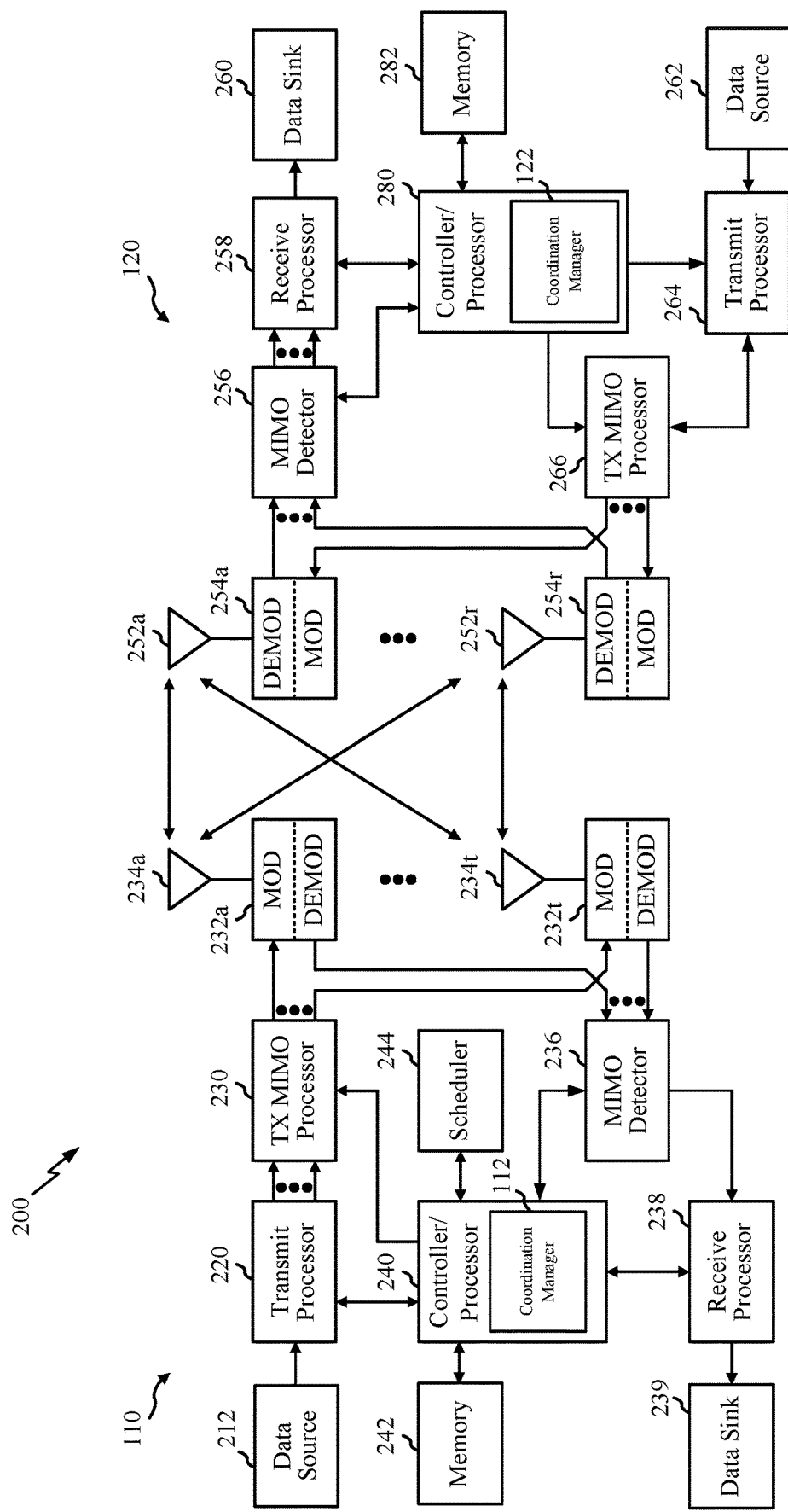
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communications network 100 of FIG. 1), which may be used to implement aspects of the present disclosure. For example, antennas 252, processors 266, 258, 264, and/or controller/processor 280, which includes Coordination Manager 122, of the UE 120 and/or antennas 234, processors 220, 230, 238, and/or controller/processor 240, which includes Coordination Manager 112, of the BS 110 may be used to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t in transceivers. Each modulator 232 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120, the antennas 252a-252r may receive the DL signals from the BS 110 and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the UL signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the DL and/or UL.

The controller/processor 280 and/or other processors and modules at the UE 120 may perform or direct the execution of processes for the techniques described herein. For example, the controller/processor 280 of the UE 120 may be configured to perform operations 500 of FIG. 5. Similarly, the controller/processor 240 and/or other processors and modules at the BS 110 may perform or direct the execution of processes for the techniques described herein. For example, the controller/processor 240 of the BS 110 may be configured to perform operations 600 of FIG. 6.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as channel state information (CSI) related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Multiple Subscriber Identification Module (Multi-SIM) User Equipments (UEs)

New Radio (NR) concurrent radio-access technology (RAT) operation generally refers to operating multiple simultaneous active connections with at least one connection being on NR. For example, the two connections may involve Long Term Evolution (LTE) and NR connections, or both NR connections. Multi subscriber identification module (multi-SIM) devices are able to connect to multiple networks independently without network awareness. Different user equipment (UE) behaviors may occur based on different implementations like dual-SIM dual active (DSDA) or dual-SIM dual standby (DSDS). DSDS generally refers to a dual-SIM deployment where two SIM cards of the UE may not be able to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM (DSM) receivers allow the different SIMs to support a variety of different combination options. For example, DSIM devices could support the following:
 SA-NR+SA-NR: both SIMs could support standalone (SA) NR (SA-NR);
 NSA-NR+LTE: one SIM supports non-standalone (NSA) while another SIM supports LTE;
 LTE+LTE: both SIMs support LTE;
 LTE+W: one SIM supports LTE, the other supports wideband code division multiple access (CDMA); or any other combination (X RAT+X RAT both SIMs the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes:
 (1) Idle+Idle: 2 or more SUBs in Idle camp to the same cell (2) Connected+Idle: 1 SUB in Idle and 1 Sub Connected camp to the same cell In conventional multi-SIM deployments, in scenarios where the UE is performing a low priority activity via a first SIM and another high priority activity is triggered on the same or different SIM of the UE, the high priority activity may be delayed, significantly impacting the performance of the UE. For example, assume an out of service indication is triggered on a SIM while another (or same) SIM is performing a closed subscriber group (CSG) autonomous search function. In this example, the recovery from the out of service may be delayed due to the CSG autonomous search, which may involve performing measurements for multiple CSG cells, performing a full band scan to obtain a given CSG cell, etc. These measurements and band scans may utilize radio frequency (RF) resources of the UE, causing tune aways and increasing the delay time for out of service recovery on the SIM in which the out of service indication is triggered on.

In some examples, in scenarios where a packet switch (PS) call/throughput is triggered on a SIM while another (or same) SIM is performing a CSG autonomous search function, the triggered SIM may experience throughput degradation due to the CSG autonomous search function. In some examples, in scenarios where a SIM is not running throughput but the network sends measurement to the SIM for NR addition while another (or same) SIM is performing CSG autonomous search function, there may be a delay in NR measurements, additions/deletions/configurations, etc., in the triggered SIM, due to tune aways triggered from the CSG autonomous search function. In some examples, in scenarios where a network is running a timer for a given NR configuration on a SIM and there is a delay on that configuration, the network may delete NR object(s) and deactivate NR from that SIM.

Example Solutions for Coordination of Communication on Multiple Links for Multiple Subscriber Identification Modules (SIMs)

Aspects of the present disclosure present techniques to dynamically change gap patterns allowing necessary interruptions on a first link associated with a first subscriber identification module (SIM) of a user equipment (UE) in order to establish or use a second link associated with a second SIM of the UE. The techniques may allow the UE and/or a network entity to adapt the gap patterns to changing scenarios, such as changing traffic patterns and link quality.

As described above, in concurrent radio access technology (C-RAT) and multi-SIM scenarios, a UE may not have the capability to receive data or signaling simultaneously on both access links. This may happen, for example, when a UE has only a single receive chain. Accordingly, when a UE is capable of receiving on both links simultaneously, it may not use full capability on each link due to the sharing of receive elements.

Figure 3:
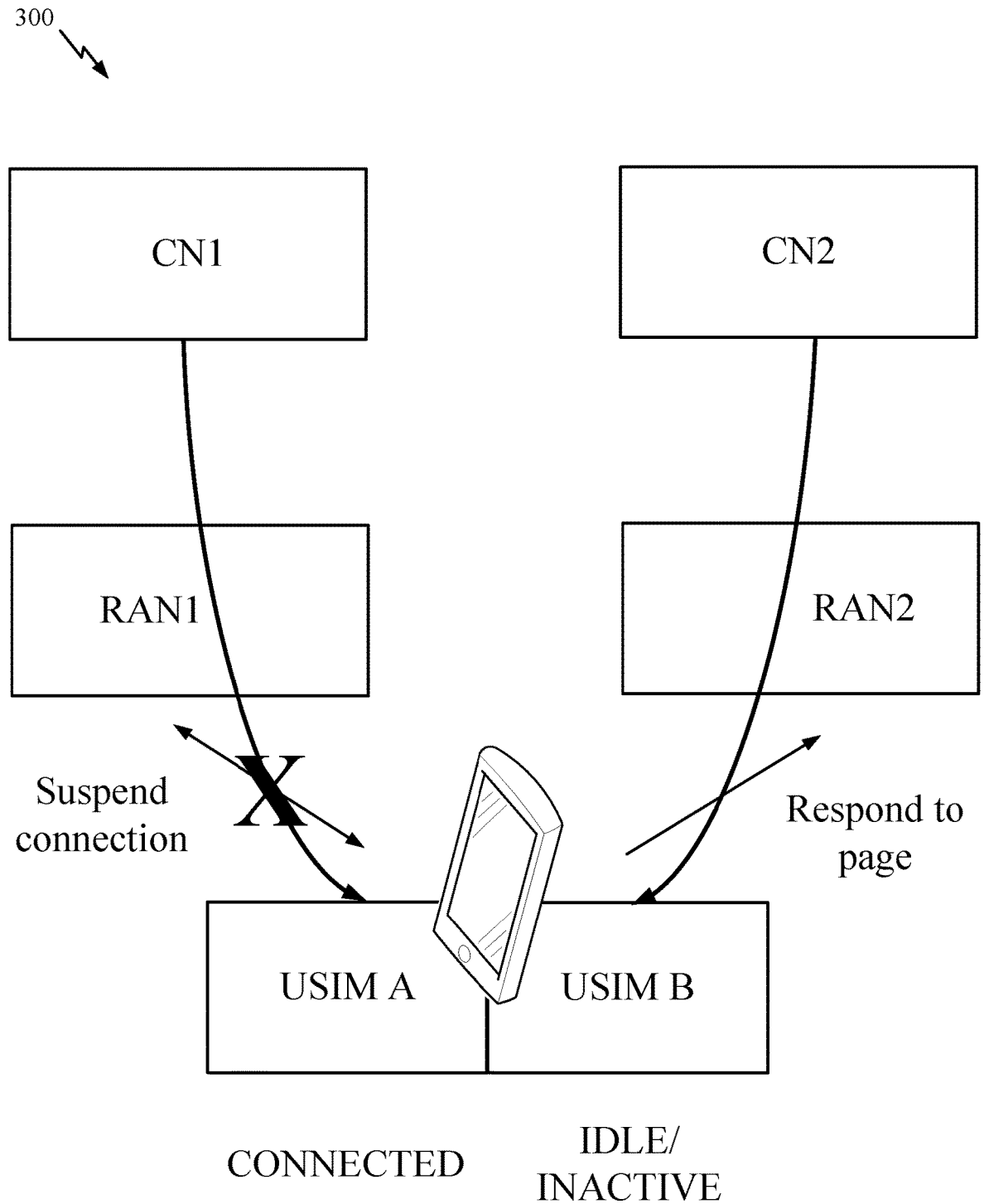
FIG. 3 illustrates an example multiple subscriber identity module (multi-SIM) deployment for a UE, in which certain aspects of the present disclosure may be practiced.

FIG. 3 illustrates an example multi-SIM deployment for a UE, in which certain aspects of the present disclosure may be practiced. As shown in FIG. 3, multiple universal SIMs (here, USIM A and USIM B) may share common radio resources. While in a connected mode in RAN1 with USIM A, the UE may need to suspend operation in RAN1 to be able to monitor (and respond to) paging of USIM B in RAN2. However, without coordination with the network, when suspending operation in RAN1 to monitor paging in RAN2, the UE may miss some packets transmitted by the network to the UE during this time.

Aspects of the present disclosure provide a solution that allows for coordination between a UE and a network entities (e.g., base station(s) (BS(s))) to establish patterns of gaps that may allow for necessary interruptions on one link and/or reduced UE capability to allow the UE to receive on both links. The techniques may generally apply to coordinate communications on any type of multiple links.

Figure 4:
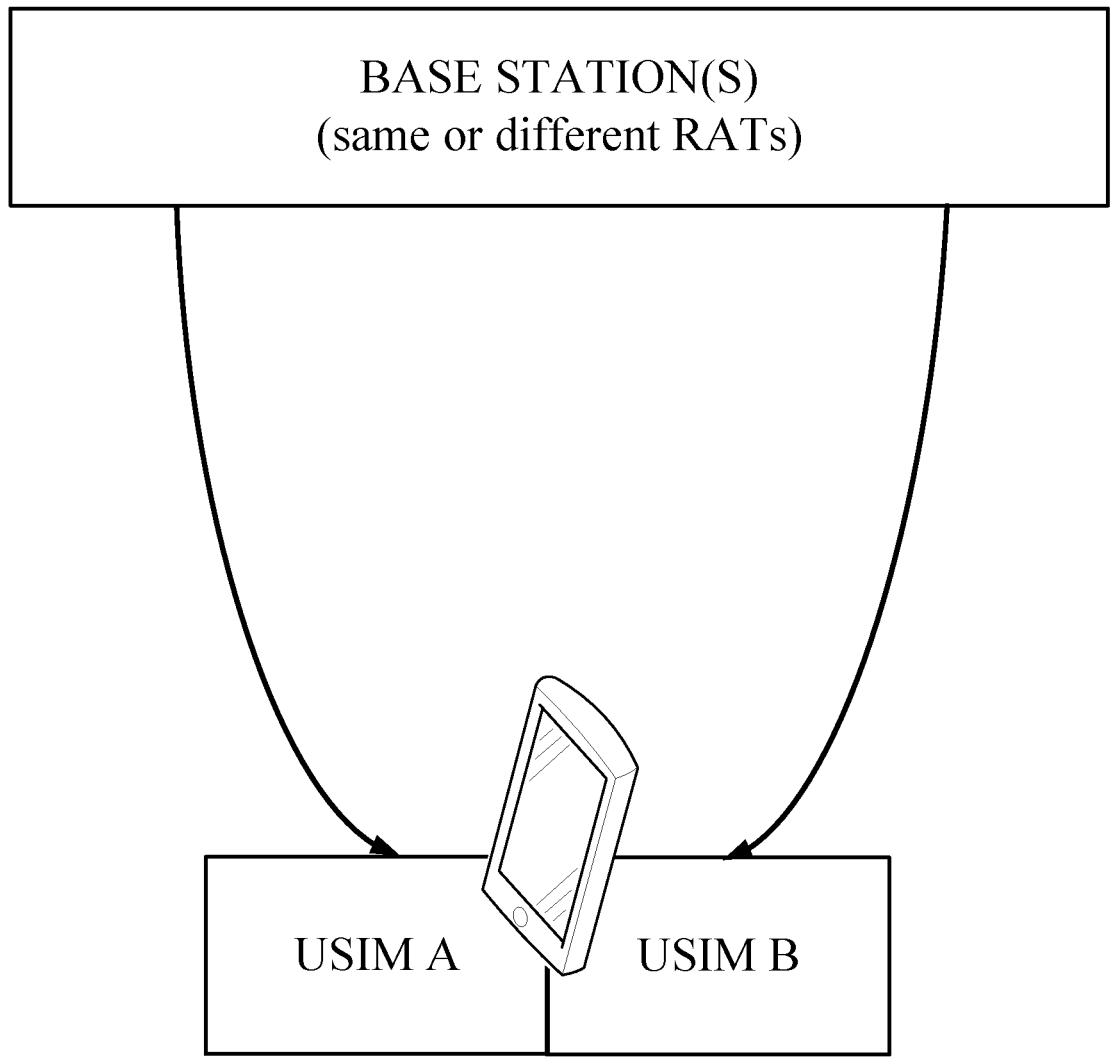
FIG. 4 illustrates another example multi-SIM deployment for a UE, in which certain aspects of the present disclosure may be practiced.

FIG. 4 illustrates another example multi-SIM deployment for a UE, in which certain aspects of the present disclosure may be practiced. As illustrated in FIG. 4, multiple links of a UE may be of different radio access technologies (RATs) and/or BSs, and the techniques may also apply to coordinate gaps for multiple links to the same BS (e.g., when two USIMs are from the same operator).

Figure 5:
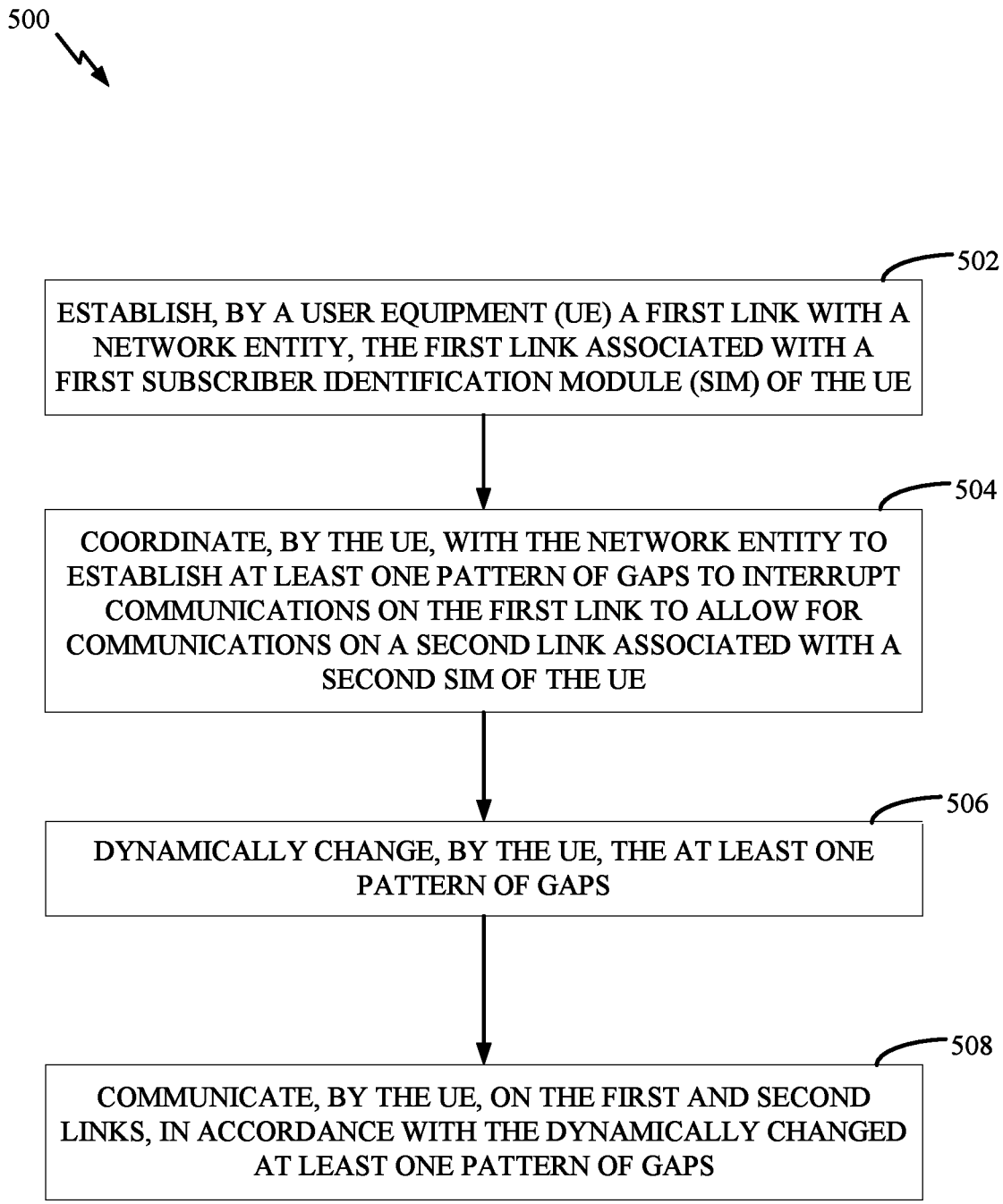
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. The operations 500 may be performed, for example, by UE 120 of FIG. 1 or 2 equipped with multiple SIMs (e.g., USIM A and USIM B as shown in FIGS. 3 and 4).

The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280 of FIG. 2) obtaining and/or outputting signals.

Operations 500 begin, at block 502, by a UE establishing a first link with a network entity, such as the BS(s) shown in FIG. 4, which may be of any RAT. The first link is associated with a first SIM of the UE. For example the first SIM may be USIM A as shown in FIGS. 3 and 4.

At block 504, the UE coordinates with the network entity to establish at least one pattern of gaps to interrupt communications on the first link, to allow for communications on a second link associated with a second SIM of the UE. For example, the second SIM may be USIM B as shown in FIGS. 3 and 4.

At block 506, the UE dynamically changes the at least one pattern of gaps. For example, the UE may request or suggest a new pattern of gaps (different from the established pattern of gaps) to the network entity.

At block 508, the UE communicates with the network entity on the first and the second links in accordance with the dynamically changed at least one pattern of gaps. For example, as shown in FIG. 3, the UE may "leave" one USIM (e.g., USIM A) in order to monitor for/respond to a page for the other USIM (e.g., USIM B).

Figure 6:
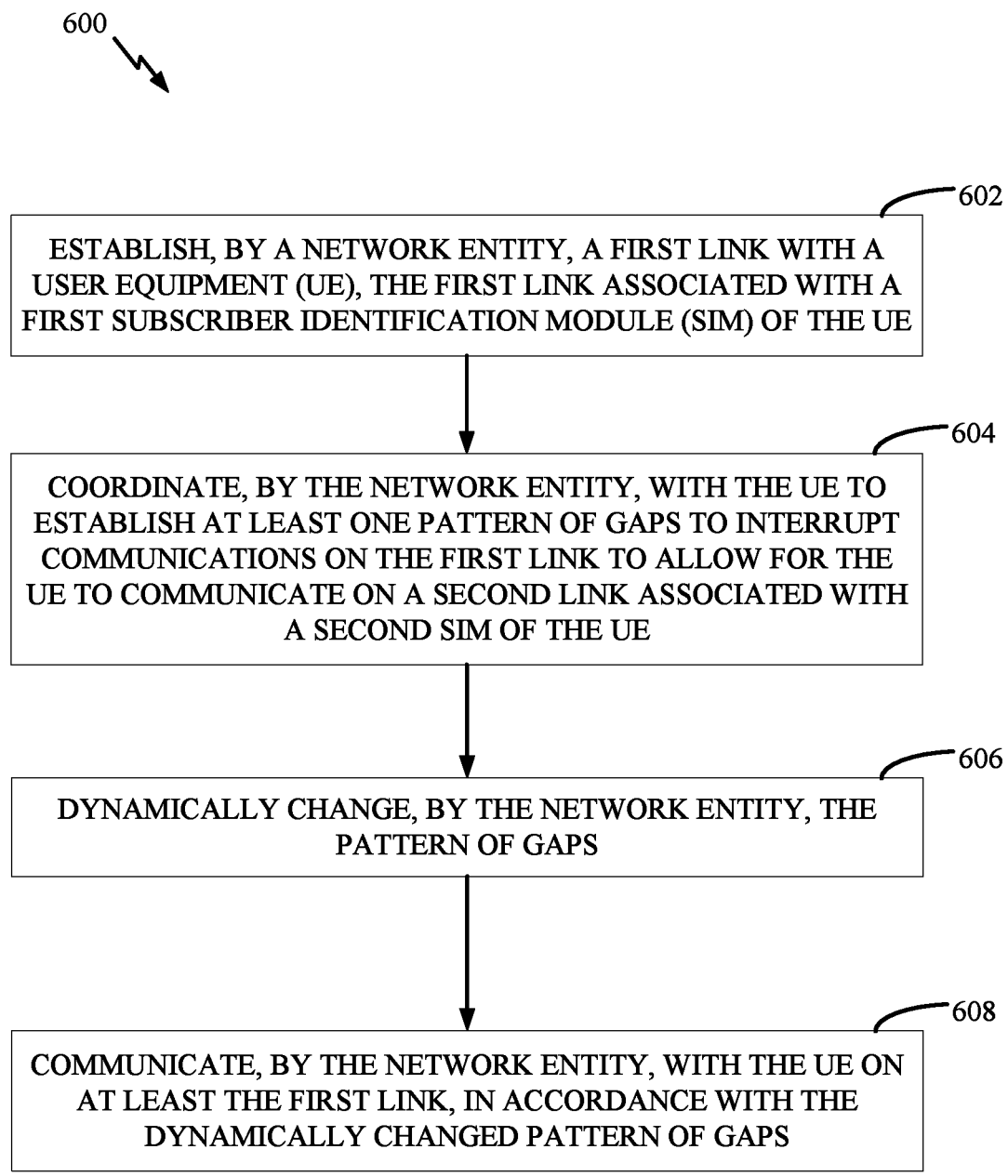
FIG. 6 is a flow diagram illustrating example operations for wireless communication by a network entity, in accordance with certain aspects of the present disclosure.

FIG. 6 illustrates example operations 600 for wireless communication by a network entity and may be considered complementary to operations 500 of FIG. 5. The operations 600 may be performed, for example, by a BS (e.g., a gNB, eNB, or of any generation) to coordinate gap patterns with a multi-SIM UE (performing operations 500 of FIG. 5).

The operations 600 may be implemented as software components that are executed and run on one or more processors (e.g., controller/processor 240 of FIG. 2). Further, the transmission and reception of signals by the network entity in operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 600 begin, at 602, by a network entity establishing a first link with a UE. The first link is associated with a first SIM of the UE, such as USIM A as shown in FIGS. 3 and 4.

At 604, the network entity coordinates with the UE to establish at least one pattern of gaps to interrupt communications on the first link, to allow for the UE to communicate on a second link. The second link is associated with a second SIM of the UE, such as USIM B as shown in FIGS. 3 and 4.

At 606, the network entity dynamically changes the at least one pattern of gaps. For example, the change of the pattern of gaps may be in response to requests from the UE, or, in other implementations, according to suggestions or schemes previously provided by the UE (such as during the initial coordination).

At 608, the network entity communicates with the UE on at least the first link in accordance with the dynamically changed at least one pattern of gaps. In some cases, the network entity communicates with the UE on both the first link associated with the first SIM and on the second link associated with the second SIM.

Figure 7:
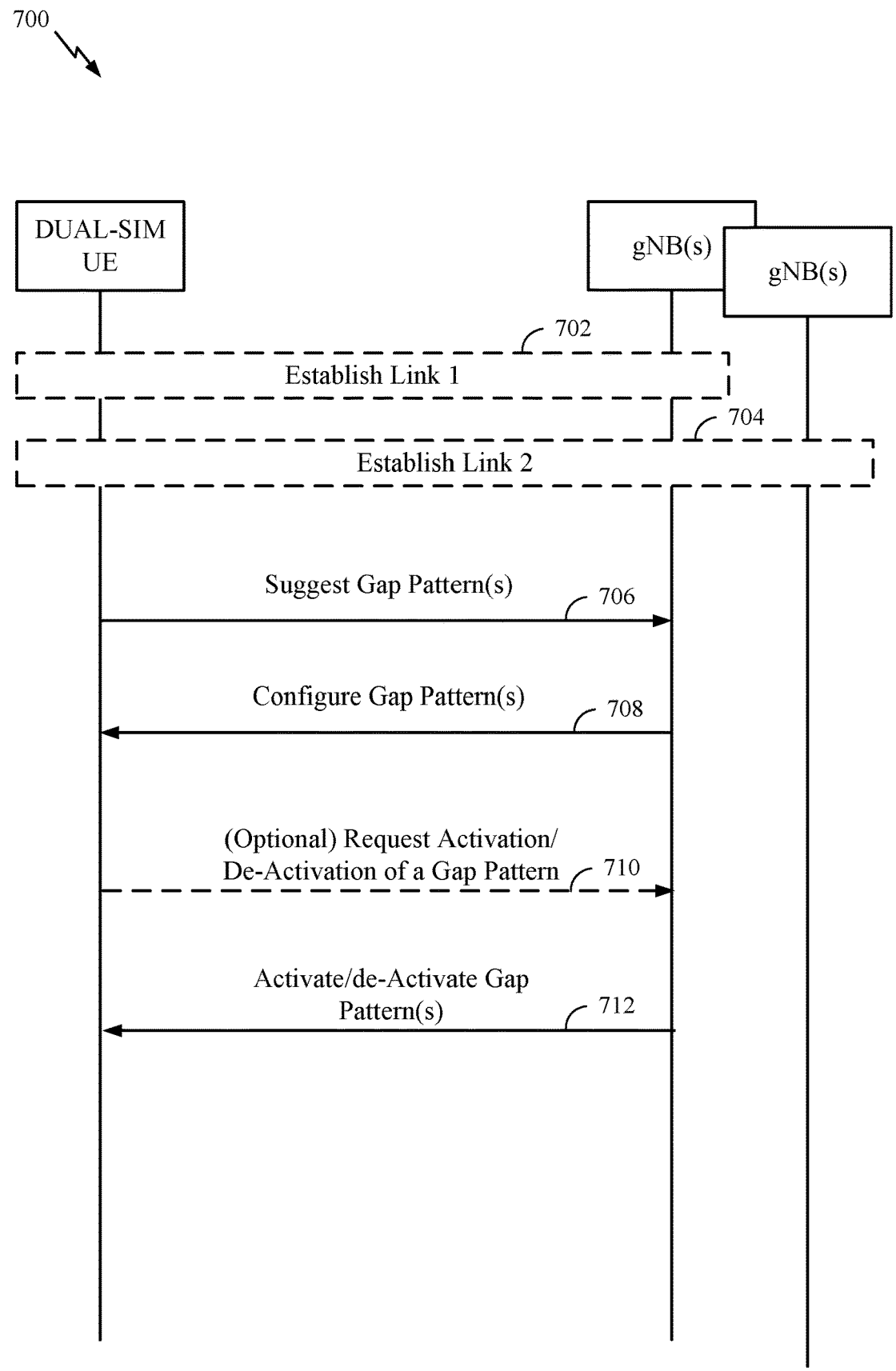
FIG. 7 is a call flow diagram illustrating an approach for dynamically changing patterns of gaps for communication on a second link, in accordance with certain aspects of the present disclosure.

Operations 500 and 600 of FIGS. 5 and 6 may be understood with reference to FIG. 7, which illustrates the example coordination of gap patterns as described herein. In other words, the dual-SIM UE of FIG. 7 may perform operations 500, while one of the gNBs of FIG. 7 may perform operations 600.

FIG. 7 is a call flow diagram illustrating an approach for dynamically changing patterns of gaps for communication on a second link, in accordance with certain aspects of the present disclosure. As shown in FIG. 7, at 702 and 704, respectively, the UE may establish a first link, Link 1 (e.g., for USIM A), and a second link, Link 2 (e.g., with USIM B), with one or more gNBs (which may be of the same or different RATs). While FIG. 7 depicts a UE establishing Link 1 and Link 2 with one or more BSs or gNBs, in other implementations, the UE may establish Link 1 and Link 2 with a same BS.

The UE may then coordinate with the gNB(s) to establish gap pattern(s). As illustrated, in some cases, at 706, the UE may suggest one or more gap pattern(s) to the gNB (allowing for communications on the second link). In some cases, the UE may inform the gNB(s) of a need to use a second link, as an alternative or in addition to, explicitly suggesting gap patterns. At 708, the gNB(s) may configure the UE with one or more gap patterns. For example, the gNB(s) may configure the UE (via radio resource control (RRC) signaling) with one or more gap patterns determined based, at least in part, on the UE's suggestion (and/or the configured gap patterns may be determined based on other factors).

The gap patterns (in some cases, suggested or requested by the UE), or at least one pattern of gaps, may be periodic, aperiodic, or semi-persistent. Where a UE suggests gap patterns that are aperiodic, the UE may intend for (e.g., need) such gap patterns to apply once (e.g., and subsequently revert back to a previous gap pattern).

In some cases, the gap patterns may be defined (and, in some cases, requested by the UE) at a slot or mini-slot granularity. In some other cases, the one or more suggested (or requested) gap patterns may include slots or mini-slots for each of the first and the second SIMs. For example, when a UE does not have a preference for the first or the second SIM for the suggested gap patterns, the gap patterns may include slots or mini-slots for each of the first and the second SIMs. In some other cases, the suggested (or requested) gap patterns may include one or more gaps preferred for a downlink (DL), or one or more gaps preferred for an uplink (UL), such as at each time granularity (e.g., for time division duplex (TDD) cases).

In some cases, a UE may further suggest a minimum amount of time duration to be served on each link in a given period. In such cases, the UE may also request a maximum latency for each time period from the gNB. In other cases, the UE may suggest a maximum latency for each given period.

In some cases, the UE may suggest one or more patterns of gaps based, at least in part, on predicted traffic patterns of the first SIM and/or second SIM. In some cases, the UE may suggest one or more patterns of gaps based, at least in part, on observed traffic patterns for the first SIM and/or second SIM. In some cases, the UE may suggest one or more patterns of gaps based, at least in part, on quality of service (QoS) requirements of traffic for the first SIM and/or second SIM.

As noted above, the gNB(s) may determine the gap patterns (e.g., based on a UE's request or suggestion) and signal the gap patterns to the UE (e.g., via RRC signaling). In some cases, gap configurations (patterns) may be identified by an index. In other cases, the gap pattern configuration may take into account at least one of: (1) reference signal transmissions on at least one of the first or second link or (2) feedback transmissions on at least one of the first or second link. For example, the reference signal may be a sounding reference signal (SRS) or a channel state information reference signal (CSI-RS). The feedback transmissions may include the physical uplink control channel (PUCCH) transmissions.

In some cases, the gap pattern configured by the gNB(s) may include a first set of gaps dedicated for each of the first and the second SIMs and a second set of flexible gaps. Flexible gaps are gaps that may be used by either the first or the second SIMs for communication. If a collision of potential communications on the first and the second SIMs occurs on a flexible gap, the UE may decide which of the first or the second SIMs to communicate with during the flexible gap. For example, based on protocol data unit (PDU) priority, the UE may inform a collision to a working link (such as Link 1) via physical (PHY) or medium access control (MAC) signaling. The UE may reschedule or retransmit the colliding communication of the other SIM. For example, when Link 2 is for a dynamic or configured grant, Link 2 may reschedule or retransmit the PDU. In other instances, when the transmission is a configured grant, the UE may reschedule or retransmit on its own.

In some cases, the UE may perform the gap configuration in one preferred link first and subsequently perform the gap configuration on the other link based, at least in part, on the configuration received from the first configured link. For example, once a gap pattern for the preferred link has been established, remaining gaps may be used for the other link.

In some cases, the UE may dynamically change the gap patterns by requesting a change to the gNB using RRC signaling with an explicit indication of the requested change. Alternatively, in some other cases, the UE may dynamically change the gap patterns by requesting a change to the gNB using MAC or PHY signaling indicating an index of a requested pattern.

As illustrated in FIG. 7, in some cases, at 710, the UE dynamically changes the gap pattern(s) by requesting activation or deactivation of one or more of the gap patterns. At 712, the gNB signals the UE activation/deactivation of one or more of the gap patterns (e.g., either in response to the UE's request or separately). The gNB may use RRC, MAC, or PHY signaling to activate or deactivate the gap pattern(s). Similarly, the UE may request activation/deactivation via RRC, MAC, or PHY signaling.

In some cases, dynamically changing the gap pattern may be based, at least in part, on a UE requesting an aperiodic gap via at least one of MAC or PHY signaling indicating at least one of a duration of a requested gap or an expected return time. In other instances, dynamically changing the gap pattern may be based, at least in part, on a UE informing a gNB, via at least one of the MAC or PHY signaling, when a transmission returns early from one link. This may apply to both aperiodic and periodic gap patterns.

In some cases, the techniques described herein may apply to a master cell group (MCG) and a secondary cell group (SCG), either together or separately, when a UE is in a Dual Connectivity (DC) mode. For example, the links may be established (and gap patterns coordinated with) with at least one of Link 1 or Link 2 established with a master node (MN). In some cases, at least one of Link 1 and Link 2 may be established with a secondary node (SN). In some implementations, for a master cell group (MCG), a UE may communicate and coordinate with the MN via one of Link 1 or Link 2. For a secondary cell group (SCG), the UE may send requests to the MN that then coordinates with the SN before the SN responds to the UE. Alternatively, the UE may communicate and coordinate with the SN directly.

Example Wireless Communications Devices

Figure 8:
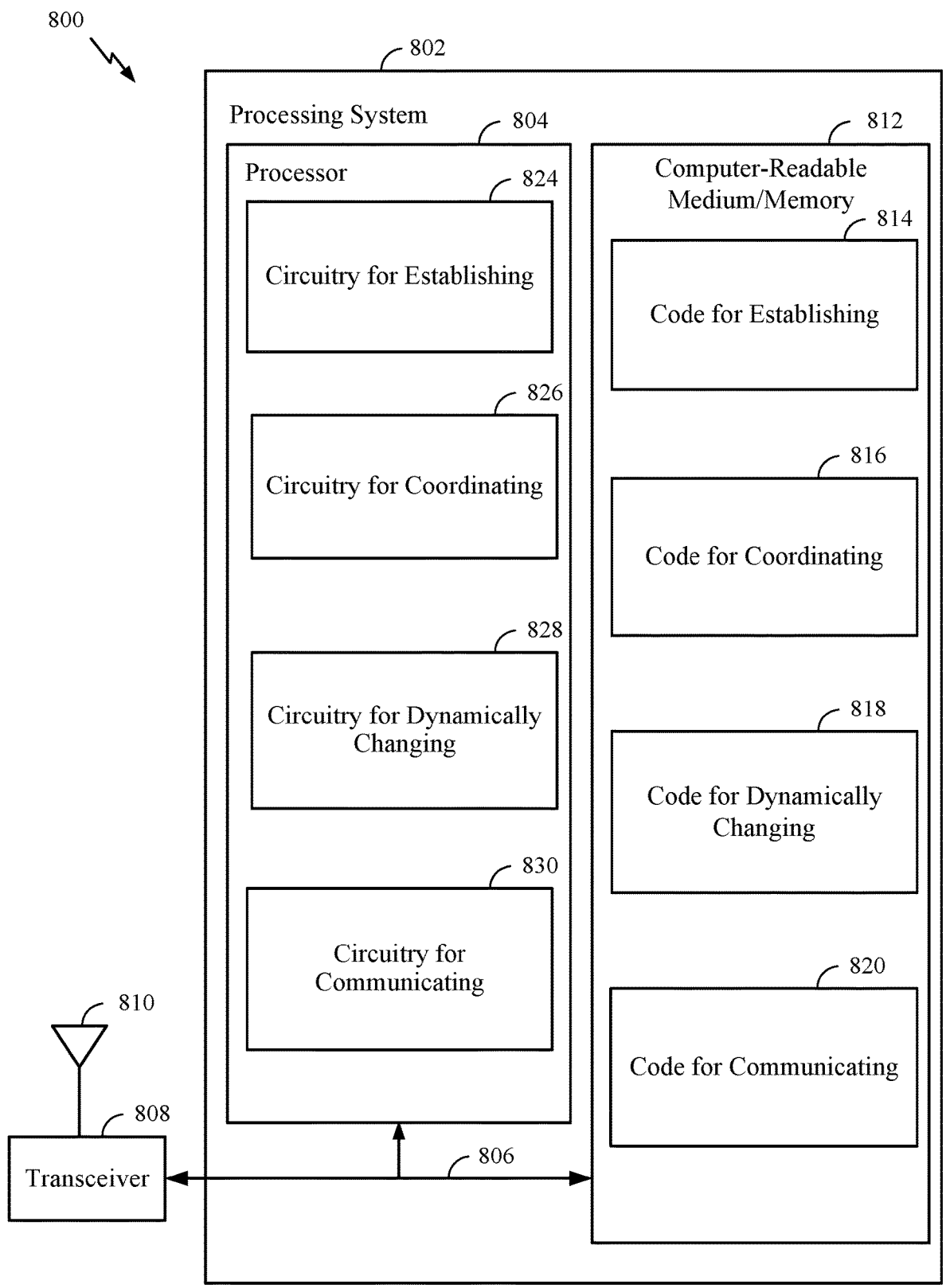
FIG. 8 illustrates a communications device that may include various components configured to perform operations for the techniques disclosed herein in accordance with aspects of the present disclosure.

FIG. 8 illustrates a communications device 800 that includes various components operable, configured, or adapted to perform operations for the techniques disclosed herein, such as the operations illustrated in FIGS. 5 and 7. In some examples, communications device 800 may be a user equipment (UE), such as UE 120 described with respect to FIGS. 1 and 2 and equipped with multiple subscriber identification modules (SIMs) (e.g., universal SIM (USIM) A and USIM B as shown in FIGS. 3 and 4).

Communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

Processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 5 and 7, or other operations for performing the various techniques discussed herein.

In certain aspects, computer-readable medium/memory 812 stores code 814 for establishing; code 816 for coordinating; code 818 for dynamically changing; and code 820 for communicating.

In some cases, code 814 for establishing may include code for establishing a first link with a network entity, the first link associated with a first SIM of the UE. In some cases, code 816 for coordinating may include code for coordinating with the network entity to establish at least one pattern of gaps to interrupt communications on the first link to allow for communications on a second link associated with a second SIM of the UE. In some cases, code 818 for dynamically changing may include code for dynamically changing the at least one pattern of gaps. In some cases, code 820 for communicating may include code for communicating on the first and second links, in accordance with the dynamically changed at least one pattern of gaps.

In certain aspects, the processor 804 has circuitry configured to implement the code stored in the computer-readable medium/memory 812. The processor 804 includes circuitry 824 for establishing; circuitry 826 for coordinating; circuitry 828 for dynamically changing; and circuitry 830 for communicating.

In some cases, circuitry 824 for establishing may include circuitry for establishing a first link with a network entity, the first link associated with a first SIM of the UE. In some cases, circuitry 826 for coordinating may include circuitry for coordinating with the network entity to establish at least one pattern of gaps to interrupt communications on the first link to allow for communications on a second link associated with a second SIM of the UE. In some cases, circuitry 828 for dynamically changing may include circuitry for dynamically changing the at least one pattern of gaps. In some cases, circuitry 830 for communicating may include circuitry for communicating on the first and second links, in accordance with the dynamically changed at least one pattern of gaps.

In some cases, the operations illustrated in FIG. 5, as well as other operations described herein, may be implemented by one or more means-plus-function components. For example, in some cases, such operations may be implemented by means for determining and means for providing.

In some cases, means for establishing, means for coordinating, means for dynamically changing, and means for communicating, includes a processing system, which may include one or more processors, such as the receive processor 258, the transmit processor 264, the TX MIMO processor 266, and/or the controller/processor 280 of the UE 120 illustrated in FIG. 2 and/or the processing system 802 of the communication device 800 in FIG. 8.

The transceiver 808 may provide a means for receiving or transmitting information such as packets, user data, or control information associated with various information channels (e.g., control channels, data channels, information related to SR, etc.). Information may be passed on to other components of the communications device 800. The antenna 810 may correspond to a single antenna or a set of antennas. The transceiver 808 may provide means for transmitting signals generated by other components of the communications device 800.

Means for receiving or means for obtaining may include a receiver (such as the receive processor 258) or antenna(s) 252 of the UE 120 illustrated in FIG. 2. Means for transmitting or means for outputting may include a transmitter (such as the transmit processor 264) or antenna(s) 252 of the UE 120 illustrated in FIG. 2.

Notably, FIG. 8 is just use one example, and many other examples and configurations of communications device 800 are possible.

Figure 9:
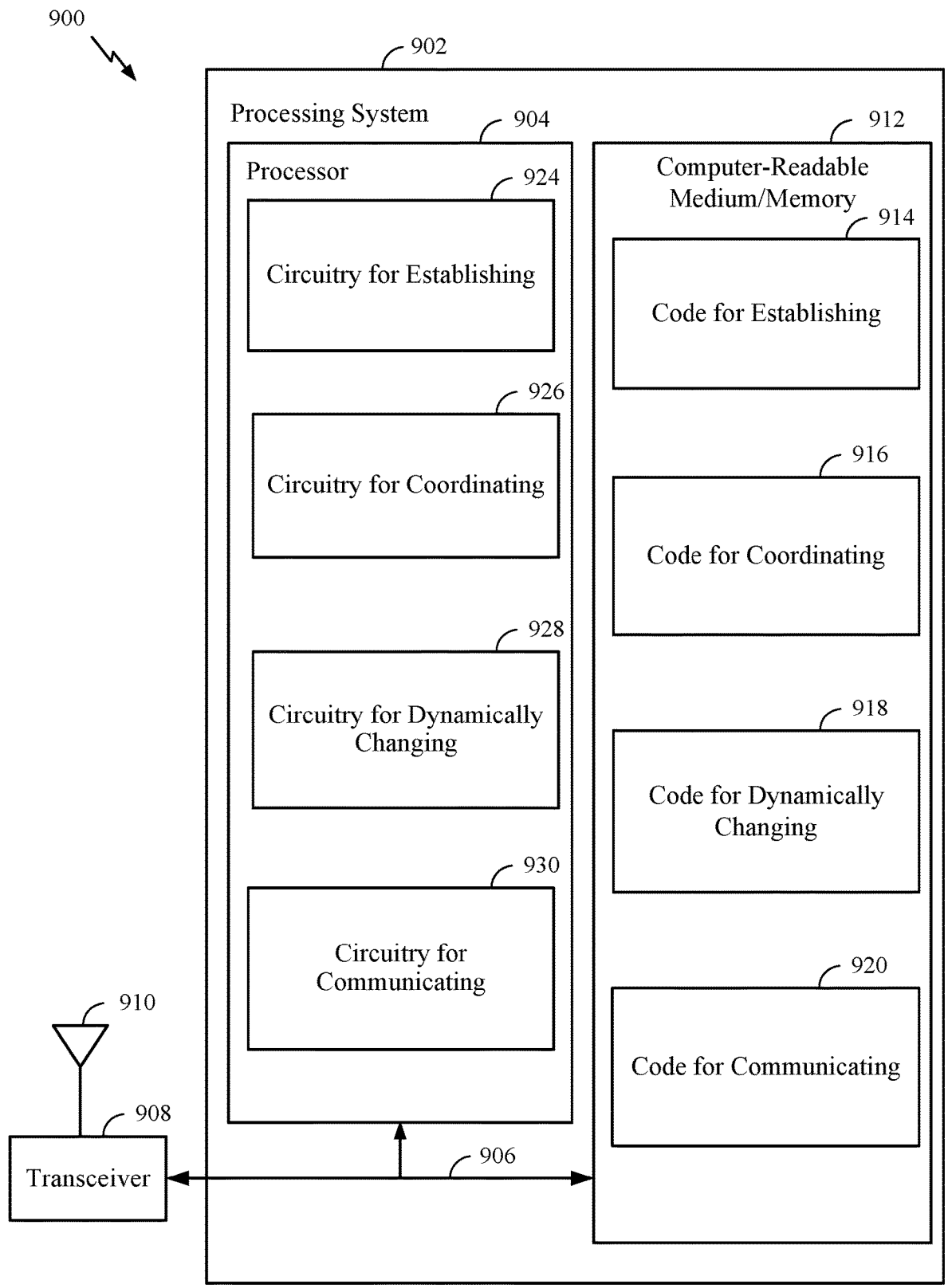
FIG. 9 illustrates a communications device that may include various components configured to perform operations for the techniques disclosed herein in accordance with aspects of the present disclosure.

FIG. 9 illustrates a communications device 900 that includes various components operable, configured, or adapted to perform operations for the techniques disclosed herein, such as the operations illustrated in FIGS. 6 and 7. In some examples, communications device 900 may be a base station (BS) (e.g., gNB), such as BS 110 described with respect to FIGS. 1 and 2.

Communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

Processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 6 and 7, or other operations for performing the various techniques discussed herein.

In certain aspects, computer-readable medium/memory 912 stores code 914 for establishing; code 916 for coordinating; code 918 for dynamically changing; and code 920 for communicating.

In some cases, code 914 for establishing may include code for establishing a first link with a UE, the first link associated with a first subscriber identification module (SIM) of the UE. In some cases, code 916 for coordinating may include code for coordinating with the UE to establish at least one pattern of gaps to interrupt communications on the first link to allow for the UE to communicate on a second link associated with a second SIM of the UE. In some cases, code 918 for dynamically changing may include code for dynamically changing the at least one pattern of gaps. In some cases, code 920 for communicating may include code for communicating with the UE on at least the first link, in accordance with the dynamically changed at least one pattern of gaps.

In certain aspects, the processor 904 has circuitry configured to implement the code stored in the computer-readable medium/memory 912. The processor 904 includes circuitry 924 for establishing; circuitry 926 for coordinating; circuitry 928 for dynamically changing; and circuitry 930 for communicating.

In some cases, circuitry 924 for establishing may include circuitry for establishing a first link with a UE, the first link associated with a first subscriber identification module (SIM) of the UE. In some cases, circuitry 926 for coordinating may include circuitry for coordinating with the UE to establish at least one pattern of gaps to interrupt communications on the first link to allow for the UE to communicate on a second link associated with a second SIM of the UE. In some cases, circuitry 928 for dynamically changing may include circuitry for dynamically changing the at least one pattern of gaps. In some cases, circuitry 930 for communicating may include circuitry for communicating with the UE on at least the first link, in accordance with the dynamically changed at least one pattern of gaps.

In some cases, means for establishing, means for coordinating, means for dynamically changing, and means for communicating, includes a processing system, which may include one or more processors, such as the receive processor 238, the transmit processor 220, the TX MIMO processor 230, and/or the controller/processor 240 of the BS 110 illustrated in FIG. 2 and/or the processing system 902 of the communication device 900 in FIG. 9.

The transceiver 908 may provide a means for receiving or transmitting information such as packets, user data, or control information associated with various information channels (e.g., control channels, data channels, information related to SR, etc.). Information may be passed on to other components of the communications device 900. The antenna 910 may correspond to a single antenna or a set of antennas.

The transceiver 908 may provide means for transmitting signals generated by other components of the communications device 900.

Means for receiving or means for obtaining may include a receiver (such as the receive processor 238) or antenna(s) 234 of the BS 110 illustrated in FIG. 2. Means for transmitting or means for outputting may include a transmitter (such as the transmit processor 220) or antenna(s) 234 of the BS 110 illustrated in FIG. 2.

Notably, FIG. 9 is just use one example, and many other examples and configurations of communications device 900 are possible.

Example Clauses

Implementation examples are described in the following numbered clauses:

Clause 1: An apparatus for wireless communication by a user equipment (UE), comprising: at least one processor; and a memory coupled to the at least one processor, the memory including instructions executable by the at least one processor to cause the apparatus to: establish a first link with a network entity, the first link associated with a first subscriber identification module (SIM) of the UE; coordinate with the network entity to establish at least one pattern of gaps to interrupt communications on the first link to allow for communications on a second link associated with a second SIM of the UE; dynamically change the at least one pattern of gaps; and communicate on the first and second links, in accordance with the dynamically changed at least one pattern of gaps.

Clause 2: The apparatus of Clause 1, wherein the first and second links are established with: a same base station (BS); different BSs; or different radio access technologies (RATs).

Clause 3: The apparatus of Clause 1 or 2, wherein in order to coordinate, the memory further includes instructions executable by the at least one processor to cause the apparatus to at least one of: inform the network entity of the need for gaps to use the second link; or suggest one or more patterns of gaps to use the second link.

Clause 4: The apparatus of Clause 3, wherein the one or more patterns of gaps comprise periodic, aperiodic, or semi-persistent patterns.

Clause 5: The apparatus of Clause 3 or 4, wherein the one or more suggested gap patterns include at least one of: one or more gaps preferred for downlink; one or more gaps preferred for uplink; or one or more gaps where the UE has no preference regarding downlink or uplink.

Clause 6: The apparatus of any of Clauses 3-5, wherein the UE suggests at least one of: a minimum amount of time duration to be served on each link in a given period; or a maximum latency for each period.

Clause 7: The apparatus of any of Clauses 1-6, wherein in order to coordinate, the memory further includes instructions executable by the at least one processor to cause the apparatus to: receive signaling, from the network entity, of one or more gap pattern configurations.

Clause 8: The apparatus of Clause 7, wherein at least one pattern of gaps includes: a first set of dedicated gaps for each of the first SIM and the second SIM; and a second set of flexible gaps that can be used by either the first SIM or the second SIM.

Clause 9: The apparatus of Clause 8, wherein the memory further includes instructions executable by the at least one processor to cause the apparatus to, if a collision of potential communications on the first SIM and the second SIM happens on a flexible gap: select which of the first SIM or the second SIM to communicate with during the flexible gap; and signal an indication of the collision to at least the first SIM or the second SIM not selected for communication.

Clause 10: The apparatus of Clause 9, wherein the memory further includes instructions executable by the at least one processor to cause the apparatus to reschedule or retransmit a colliding communication of the first SIM or the second SIM not selected for communication.

Clause 11: The apparatus of any of Clauses 7-10, wherein in order to coordinate, the memory further includes instructions executable by the at least one processor to cause the apparatus to: perform a gap configuration on the first link; and subsequently perform a gap configuration on the second link.

Clause 12: The apparatus of any of Clauses 1-11, wherein in order to dynamically change the at least one pattern of gaps, the memory further includes instructions executable by the at least one processor to cause the apparatus to request a change to at least one of the gap patterns via at least one of: radio resource control (RRC) signaling with an explicit indication of the requested change; or medium access control (MAC) or physical layer (PHY) signaling that indicates an index of a requested pattern.

Clause 13: The apparatus of any of Clauses 1-12, wherein dynamically changing the at least one pattern of gaps is based on at least one of: signaling, from the network entity, activating or deactivating one or more of the at least one pattern of gaps; or signaling, from the UE, requesting activation or deactivation of one or more of the at least one pattern of gaps.

Clause 14: The apparatus of any of Clauses 1-13, wherein dynamically changing the at least one pattern of gaps is based on the UE requesting an aperiodic gap via at least one of medium access control (MAC) or physical layer (PHY) signaling that indicates at least one of a duration of requested gap or an expected return time.

Clause 15: The apparatus of any of Clauses 1-14, wherein dynamically changing the at least one pattern of gaps is based on the UE informing the network entity when it returns early from one link via at least one of medium access control (MAC) or physical layer (PHY) signaling.

Clause 16: The apparatus of any of Clauses 1-15, wherein: at least one of the first or second links is with a master node (MN); and at least one of the first or second links is with a secondary node (SN).

Clause 17: An apparatus for wireless communication by a network entity, comprising: at least one processor; and a memory coupled to the at least one processor, the memory including instructions executable by the at least one processor to cause the apparatus to: establish a first link with a user equipment (UE), the first link associated with a first subscriber identification module (SIM) of the UE; coordinate with the UE to establish at least one pattern of gaps to interrupt communications on the first link to allow for the UE to communicate on a second link associated with a second SIM of the UE; dynamically change the at least one pattern of gaps; and communicate with the UE on at least the first link, in accordance with the dynamically changed at least one pattern of gaps.

Clause 18: The apparatus of Clause 17, wherein both the first and second links are established with the network entity.

Clause 19: The apparatus of Clause 17 or 18, wherein in order to coordinate, the memory further includes instructions executable by the at least one processor to cause the apparatus to at least one of: the UE informing the network entity of the need for gaps to use the second link; or the UE suggesting one or more patterns of gaps to use the second link.

Clause 20: The apparatus of Clause 19, wherein the one or more patterns of gaps comprise periodic, aperiodic, or semi-persistent patterns.

Clause 21: The apparatus of Clause 19 or 20, wherein the one or more suggested gap patterns include at least one of: one or more gaps preferred for downlink; one or more gaps preferred for uplink; or one or more gaps where the UE has no preference regarding downlink or uplink.

Clause 22: The apparatus of any of Clauses 19-21, wherein the UE suggests at least one of: a minimum amount of time duration to be served on each link in a given period; or a maximum latency for each period.

Clause 23: The apparatus of Clause 22, wherein in order to coordinate, the memory further includes instructions executable by the at least one processor to cause the apparatus to: signal the UE one or more gap pattern configurations.

Clause 24: The apparatus of Clause 23, wherein at least one pattern of gaps includes: a first set of dedicated gaps for each of the first SIM and the second SIM; and a second set of flexible gaps that can be used by either the first SIM or the second SIM.

Clause 25: The apparatus of Clause 24, wherein dynamically changing the at least one pattern of gaps is based on a UE request for a change to at least one of the gap patterns via at least one of: radio resource control (RRC) signaling with an explicit indication of the requested change; or medium access control (MAC) or physical layer (PHY) signaling that indicates an index of a requested pattern.

Clause 26: The apparatus of any of Clauses 17-25, wherein dynamically changing the at least one pattern of gaps is based on at least one of: signaling, from the network entity, activating or deactivating one or more of the at least one pattern of gaps; or signaling, from the UE, requesting activation or deactivation of one or more of the at least one pattern of gaps.

Clause 27: The apparatus of any of Clauses 17-26, wherein dynamically changing the at least one pattern of gaps is based on the UE requesting an aperiodic gap via at least one of medium access control (MAC) or physical layer (PHY) signaling that indicates at least one of a duration of requested gap or an expected return time.

Clause 28: The apparatus of any of Clauses 17-27, wherein dynamically changing the at least one pattern of gaps is based on the UE informing the network entity when it returns early from one link via at least one of medium access control (MAC) or physical layer (PHY) signaling.

Clause 29: A method for wireless communication by a user equipment (UE), comprising: establishing a first link with a network entity, the first link associated with a first subscriber identification module (SIM) of the UE; coordinating with the network entity to establish at least one pattern of gaps to interrupt communications on the first link to allow for communications on a second link associated with a second SIM of the UE; dynamically changing the at least one pattern of gaps; and communicating on the first and second links, in accordance with the dynamically changed at least one pattern of gaps.

Clause 30: A method for wireless communication by a network entity, comprising: establishing a first link with a user equipment (UE), the first link associated with a first subscriber identification module (SIM) of the UE; coordinating with the UE to establish at least one pattern of gaps to interrupt communications on the first link to allow for the UE to communicate on a second link associated with a second SIM of the UE; dynamically changing the at least one pattern of gaps; and communicating with the UE on at least the first link, in accordance with the dynamically changed at least one pattern of gaps.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 500 of FIG. 5 and/or operations 600 of FIG. 6.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for including, means for providing, means for determining, means for staying, means for blocking, and means for initiating may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user equipment (UE), comprising:
   at least one processor; and
   a memory coupled to the at least one processor, the memory including instructions executable by the at least one processor to cause the apparatus to:
   establish a first link with a network entity, the first link associated with a first subscriber identification module (SIM) of the UE;
   suggest, to the network entity, at least one of:
      a minimum amount of time duration to be served on each of the first link and a second link in a given period in at least one pattern of gaps to interrupt communications on the first link; or
      a maximum latency for each period in the at least one pattern of gaps to interrupt communications on the first link;
   coordinate with the network entity to establish at least one pattern of gaps to allow for communications on the second link associated with a second SIM of the UE, wherein the at least one pattern of gaps is configured to provide at least one of:
      the suggested minimum amount of time duration to be served on each of the first link and the second link in the given period; or
      the suggested maximum latency for each period in the at least one pattern of gaps;
   dynamically change the at least one pattern of gaps; and
   communicate on the first and second links, in accordance with the dynamically changed at least one pattern of gaps.

2. The apparatus of claim 1, wherein the first and second links are established with:
   a same base station (BS);
   different BSs; or
   different radio access technologies (RATs).

3. The apparatus of claim 1, wherein the instructions executable by the at least one processor to cause the apparatus to coordinate include instructions executable by the at least one processor to cause the apparatus to:
   inform the network entity of a need for gaps to use the second link.

4. The apparatus of claim 1, wherein:
   the memory further includes instructions executable by the at least one processor to cause the apparatus to suggest, to the network entity, one or more patterns of gaps to interrupt communications on the first link; and
   the one or more suggested patterns of gaps comprise periodic, aperiodic, or semi-persistent patterns.

5. The apparatus of claim 1, wherein:
   the memory further includes instructions executable by the at least one processor to cause the apparatus to suggest, to the network entity, one or more patterns of gaps to interrupt communications on the first link; and
   the one or more suggested patterns of gaps include at least one of:
      one or more gaps preferred for downlink;
      one or more gaps preferred for uplink; or
      one or more gaps where the UE has no preference regarding downlink or uplink.

6. The apparatus of claim 1, wherein the instructions executable by the at least one processor to cause the apparatus to coordinate include instructions executable by the at least one processor to cause the apparatus to:
   receive signaling, from the network entity, of one or more gap pattern configurations.

7. The apparatus of claim 6, wherein at least one gap pattern configuration, of the one or more gap pattern configurations, includes:
   a first set of dedicated gaps for each of the first SIM and the second SIM; and
   a second set of flexible gaps that can be used by either the first SIM or the second SIM.

8. The apparatus of claim 7, wherein the memory further includes instructions executable by the at least one processor to cause the apparatus, when a collision of potential communications on the first SIM and the second SIM happens on a flexible gap, to:
   select which of the first SIM or the second SIM to communicate with during the flexible gap; and
   signal an indication of the collision to at least the first SIM or the second SIM not selected for communication.

9. The apparatus of claim 8, wherein the memory further includes instructions executable by the at least one processor to cause the apparatus to reschedule or retransmit a colliding communication of the first SIM or the second SIM not selected for communication.

10. The apparatus of claim 6, wherein the instructions executable by the at least one processor to cause the apparatus to coordinate include instructions executable by the at least one processor to cause the apparatus to:
    perform a gap configuration on the first link; and
    subsequently perform a gap configuration on the second link.

11. The apparatus of claim 1, wherein the instructions executable by the at least one processor to cause the apparatus to dynamically change the at least one pattern of gaps include instructions executable by the at least one processor to cause the apparatus to request a change to another at least one of one or more patterns of gaps via at least one of:
    radio resource control (RRC) signaling with an explicit indication of the requested change; or
    medium access control (MAC) or physical layer (PHY) signaling that indicates an index of a requested pattern of gaps, of the one or more patterns of gaps.

12. The apparatus of claim 1, wherein the instructions executable by the at least one processor to cause the apparatus to dynamically change the at least one pattern of gaps include instructions executable by the at least one processor to cause the apparatus to dynamically change the at least one pattern of gaps based on at least one of:
    signaling, from the network entity, activating or deactivating one or more of the at least one pattern of gaps; or
    signaling, from the UE, requesting activation or deactivation of one or more of the at least one pattern of gaps.

13. The apparatus of claim 1, wherein the instructions executable by the at least one processor to cause the apparatus to dynamically change the at least one pattern of gaps include instructions executable by the at least one processor to cause the apparatus to dynamically change the at least one pattern of gaps based on a request, from the UE, of an aperiodic gap via at least one of medium access control (MAC) or physical layer (PHY) signaling that indicates at least one of a duration of a requested gap or an expected return time.

14. The apparatus of claim 1, wherein the instructions executable by the at least one processor to cause the apparatus to dynamically change the at least one pattern of gaps include instructions executable by the at least one processor to cause the apparatus to dynamically change the at least one pattern of gaps based on the UE informing the network entity when the UE returns early from one link via at least one of medium access control (MAC) or physical layer (PHY) signaling.

15. The apparatus of claim 1, wherein:
at least one of the first or second links is with a master node (MN); and
at least one of the first or second links is with a secondary node (SN).

16. An apparatus for wireless communication by a network entity, comprising:
at least one processor; and
a memory coupled to the at least one processor, the memory including instructions executable by the at least one processor to cause the apparatus to:
establish a first link with a user equipment (UE), the first link associated with a first subscriber identification module (SIM) of the UE;
receive, from the UE, at least one of:
a minimum amount of time duration to be served on each of the first link and a second link in a given period in at least one pattern of gaps to interrupt communications on the first link; or
a maximum latency for each period in the at least one pattern of gaps to interrupt communications on the first link;
coordinate with the UE to establish the at least one pattern of gaps to allow for the UE to communicate on the second link associated with a second SIM of the UE, wherein the at least one pattern of gaps is configured to provide at least one of:
the suggested minimum amount of time duration to be served on each of the first link and the second link in the given period; or
the suggested maximum latency for each period in the at least one pattern of gaps;
dynamically change the at least one pattern of gaps; and
communicate with the UE on at least the first link, in accordance with the dynamically changed at least one pattern of gaps.

17. The apparatus of claim 16, wherein both the first and second links are established with the network entity.

18. The apparatus of claim 16, wherein the instructions executable by the at least one processor to cause the apparatus to coordinate include instructions executable by the at least one processor to cause the apparatus to:
obtain, from the UE, an indication of a need for gaps to use the second link.

19. The apparatus of claim 16, wherein:
the memory further includes instructions executable by the at least one processor to cause the apparatus to receive, from the UE, one or more patterns of gaps to interrupt communications on the first link; and
the one or more suggested patterns of gaps comprise periodic, aperiodic, or semi-persistent patterns.

20. The apparatus of claim 16, wherein:
the memory further includes instructions executable by the at least one processor to cause the apparatus to receive, from the UE, one or more patterns of gaps to interrupt communications on the first link; and
the one or more suggested patterns of gaps include at least one of:
one or more gaps preferred for downlink;
one or more gaps preferred for uplink; or
one or more gaps where the UE has no preference regarding downlink or uplink.

21. The apparatus of claim 16, wherein the instructions executable by the at least one processor to cause the apparatus to coordinate include instructions executable by the at least one processor to cause the apparatus to:
signal the UE one or more gap pattern configurations.

22. The apparatus of claim 21, wherein at least one gap pattern configuration, of the one or more gap pattern configurations, includes:
a first set of dedicated gaps for each of the first SIM and the second SIM; and
a second set of flexible gaps that can be used by either the first SIM or the second SIM.

23. The apparatus of claim 22, wherein the instructions executable by the at least one processor to cause the apparatus to dynamically change the at least one pattern of gaps include instructions executable by the at least one processor to cause the apparatus to dynamically change the at least one pattern of gaps based on a UE request for a change to another at least one of the one or more suggested patterns of gaps via at least one of:
radio resource control (RRC) signaling with an explicit indication of the requested change; or
medium access control (MAC) or physical layer (PHY) signaling that indicates an index of a requested pattern.

24. The apparatus of claim 16, wherein the instructions executable by the at least one processor to cause the apparatus to dynamically change the at least one pattern of gaps include instructions executable by the at least one processor to cause the apparatus to dynamically change the at least one pattern of gaps based on at least one of:
signaling, from the network entity, activating or deactivating one or more of the at least one pattern of gaps; or
signaling, from the UE, requesting activation or deactivation of one or more of the at least one pattern of gaps.

25. The apparatus of claim 16, wherein the instructions executable by the at least one processor to cause the apparatus to dynamically change the at least one pattern of gaps include instructions executable by the at least one processor to cause the apparatus to dynamically change the at least one pattern of gaps based on a request, from the UE, of an aperiodic gap via at least one of medium access control (MAC) or physical layer (PHY) signaling that indicates at least one of a duration of a requested gap or an expected return time.

26. The apparatus of claim 16, wherein the instructions executable by the at least one processor to cause the apparatus to dynamically change the at least one pattern of gaps include instructions executable by the at least one processor to cause the apparatus to dynamically change the at least one pattern of gaps based on the UE informing the network entity when the UE returns early from one link via at least one of medium access control (MAC) or physical layer (PHY) signaling.

27. A method for wireless communication by a user equipment (UE), comprising:
establishing a first link with a network entity, the first link associated with a first subscriber identification module (SIM) of the UE;
suggesting, to the network entity, at least one of:
a minimum amount of time duration to be served on each of the first link and a second link in a given period in at least one pattern of gaps to interrupt communications on the first link; or
a maximum latency for each period in the at least one pattern of gaps to interrupt communications on the first link;
coordinating with the network entity to establish the at least one pattern of gaps to allow for communications on the second link associated with a second SIM of the UE, wherein the at least one pattern of gaps is configured to provide at least one of:
- the suggested minimum amount of time duration to be served on each of the first link and the second link in the given period; or
- the suggested maximum latency for each period in the at least one pattern of gaps;

dynamically changing the at least one pattern of gaps; and
communicating on the first and second links, in accordance with the dynamically changed at least one pattern of gaps.

28. A method for wireless communication by a network entity, comprising:
establishing a first link with a user equipment (UE), the first link associated with a first subscriber identification module (SIM) of the UE;
receiving, from the UE, at least one of:
- a minimum amount of time duration to be served on each of the first link and a second link in a given period in at least one pattern of gaps to interrupt communications on the first link; or
- a maximum latency for each period in the at least one pattern of gaps to interrupt communications on the first link;

coordinating with the UE to establish the at least one pattern of gaps to allow for the UE to communicate on the second link associated with a second SIM of the UE, wherein the at least one pattern of gaps is configured to provide at least one of:
- the suggested minimum amount of time duration to be served on each of the first link and the second link in the given period; or
- the suggested maximum latency for each period in the at least one pattern of gaps;

dynamically changing the at least one pattern of gaps; and
communicating with the UE on at least the first link, in accordance with the dynamically changed at least one pattern of gaps.

* * * * *